July 10, 1956
O. T. TROMBLAY
2,754,148
RAIN TROUGH FOR MOTOR VEHICLE WINDSHIELD
Filed Aug. 16, 1954
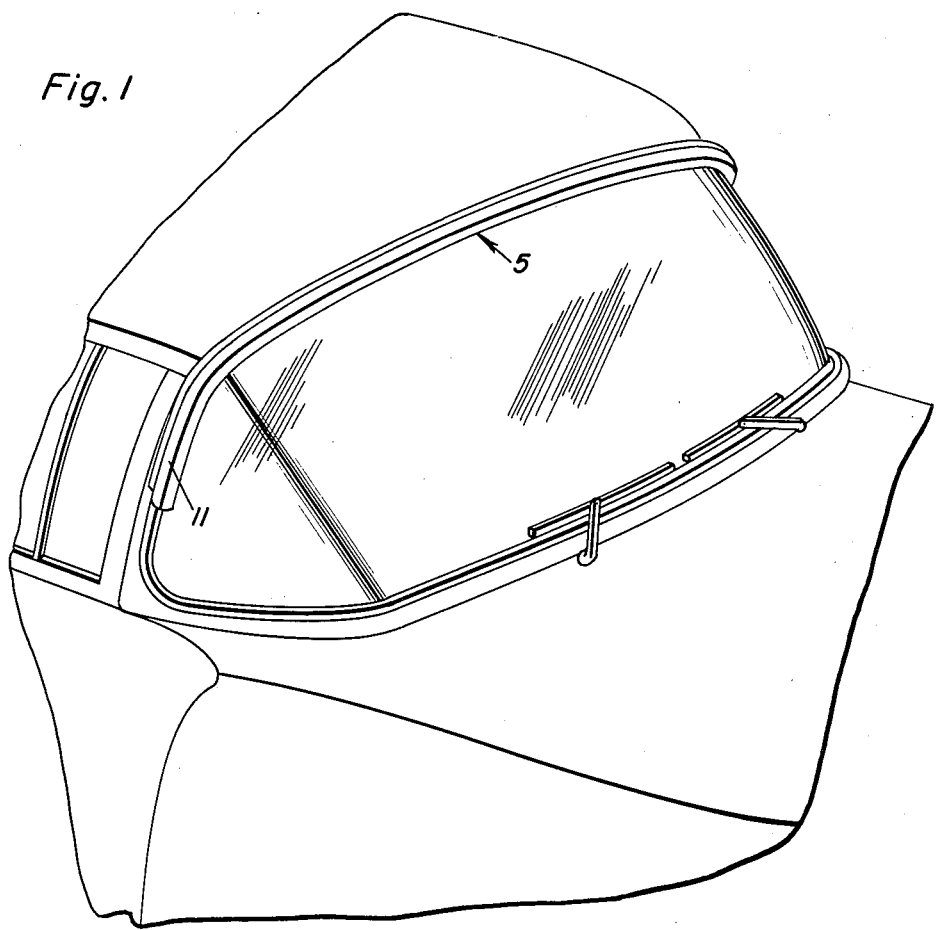
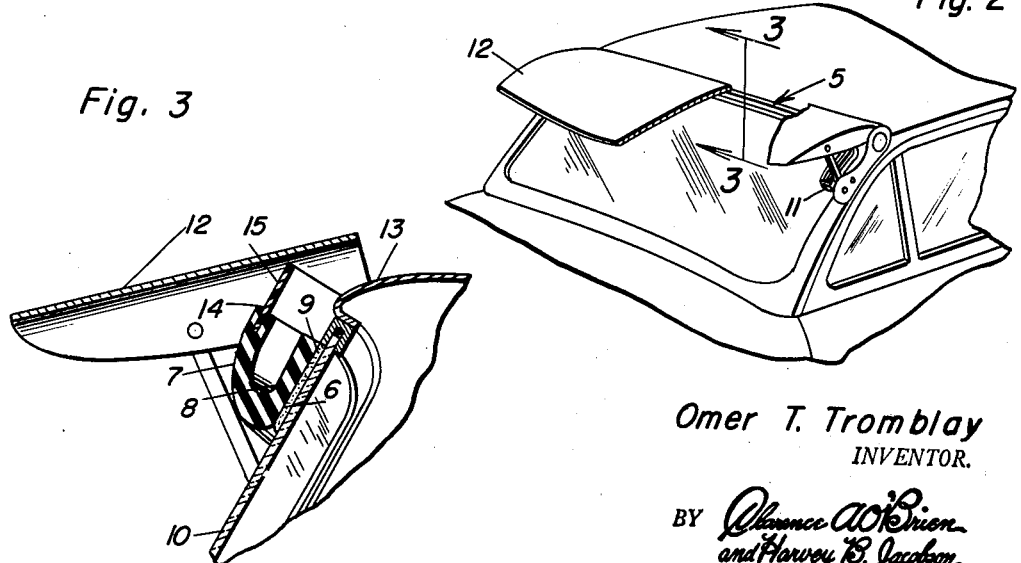
Omer T. Tromblay
INVENTOR.

United States Patent Office 2,754,148
Patented July 10, 1956

2,754,148
RAIN TROUGH FOR MOTOR VEHICLE WINDSHIELD

Omer T. Tromblay, Concord, N. H.

Application August 16, 1954, Serial No. 450,171

1 Claim. (Cl. 296—95)

The present invention relates to new and useful improvements in rain troughs for automobiles or other motor vehicles to prevent the flow of rain from the roof of the vehicle onto the windshield.

An important object of the invention is to provide a drain trough for the top of a windshield to keep the latter free of rain when the car is parked in an outdoor movie theater and to avoid the necessity of running the motor to operate the windshield wiper and further to construct the drain trough for easily and quickly attaching to the windshield without the use of fastening devices.

Another object is to provide a device of this character of simple and practical construction, which is neat and attactive in appearance, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the drain trough in position;

Figure 2 is a perspective view with parts broken away and shown in section and showing the drain trough used with a sun visor; and Figure 3 is an enlarged sectional view taken on a line 3 of Figure 2.

Referring now to the drawing in detail, wherein for the purpose of illustration, I have disclosed a preferred embodiment of my invention, the numeral 5 designates the drain trough generally which is constructed of a rubber or other type of flexible channeled strip to provide a rear flange 6 and a front flange 7 forming a channel 8 therebetween.

A waterproof adhesive 9 is applied to the outer surface of rear flange 6 for attaching to the outer surface of a windshield 10 adjacent the top thereof and the strip is of sufficient length to extend across the windshield from side to side thereof to form a rain collecting trough and to also provide downwardly extending drain troughs 11 at the ends of the strip positioned at the side portions of the windshield.

Where the automobile is equipped with an exterior sun visor 12 over the upper portion of the windshield, the trough 5 underlies the rear portion of the visor to collect rain which drains from the roof 13 of the vehicle under the visor.

The edge portion of outer flange 7 of the trough 5 is formed with a longitudinal groove 14 in which a plastic or other suitable strip 15 of self-supporting material is frictionally retained in an edgewise upstanding position to form a shield to substantially close the space between the trough and the visor. The strip 15 may be colored for ornamental purposes.

Rain flowing downwardly at the front of the roof of the vehicle and under the sun visor 12 will be collected in the trough 5 and drained at the downwardly extending open ends of the trough to keep the windshield free of rain without necessitating use of the windshield wiper, while the vehicle is parked.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In combination with a motor vehicle having a sun visor over the windshield, of a drain trough comprising an elongated channel member of flexible material and including an inner flange and an outer flange, said inner flange being adhesively attached to the surface of the windshield immediately below the front portion of the roof of the vehicle and underlying the upper portion of the sun visor to collect rain flowing from the front of the roof under the visor, said channel member including downwardly projecting rain discharging extensions at each end adjacent the sides of the windshield, said outer flange having a longitudinal groove in its upstanding edge portion, and a shield supported in an edgewise upstanding position in the groove to closely underlie the sun visor for substantially closing the space between said sun visor and said outer flange.

References Cited in the file of this patent

UNITED STATES PATENTS

| | | |
|---|---|---|
| 868,413 | Cramer | Oct. 15, 1907 |
| 1,328,383 | Ludlow | Jan. 20, 1920 |
| 1,478,279 | Henne | Dec. 18, 1923 |
| 2,610,085 | Zeeb | Sept. 9, 1952 |
| 2,615,752 | Hoag | Oct. 28, 1952 |
| 2,633,381 | Francis | Mar. 31, 1953 |